United States Patent [19]

Perbet et al.

[11] Patent Number: 4,824,216

[45] Date of Patent: Apr. 25, 1989

[54] DEVICE FOR THE MODULATION OF THE ILLUMINATING LIGHT OF AN ELECTRO-OPTIC DISPLAY SCREEN

[75] Inventors: Jean N. Perbet, Gif Sur Yvette; Michel Hareng, La Norville; Bruno Mourey, Boulogne Billancourt, all of France

[73] Assignee: Thomson-CSF, Paris, France

[21] Appl. No.: 39,721

[22] Filed: Apr. 20, 1987

[30] Foreign Application Priority Data

Apr. 22, 1986 [FR] France .............................. 86 05801

[51] Int. Cl.$^4$ .............................................. G02F 1/13
[52] U.S. Cl. ................................... 350/346; 350/332; 350/335; 350/339 R; 350/345
[58] Field of Search ................... 350/331 R, 332, 335, 350/339 R, 345, 346

[56] References Cited

U.S. PATENT DOCUMENTS

| | | | |
|---|---|---|---|
| 3,750,136 | 7/1973 | Roess | 340/324 R |
| 4,222,641 | 9/1980 | Stolov | 350/331 R X |
| 4,349,817 | 9/1982 | Hoffman et al. | 350/345 X |
| 4,460,248 | 7/1984 | Shirai | 350/335 |
| 4,516,834 | 5/1985 | Cascini | 350/335 |

FOREIGN PATENT DOCUMENTS

| | | |
|---|---|---|
| 0153147 | 8/1985 | European Pat. Off. |
| 2067813 | 7/1981 | United Kingdom |
| 2116805 | 9/1983 | United Kingdom |
| 8401037 | 3/1984 | World Int. Prop. O. |

OTHER PUBLICATIONS

Patents Abstracts of Japan, vol. 7, No. 113 (P-197) [1258], 18 May 1983 & JP A-58 35 425 (Canon K.K.) 02-03-1983.
Patents Abstracts of Japan, vol. 8, No. 89 (P-270) [1526], 24 Apr. 1984; & JP-A-59 3420 (Shin Nippon Denki K.K.).
Patents Abstracts of Japan, vol. 6, No. 59 (P-110) [937], 16 Apr. 1982; & JP-A-59 610 (Hitachi Seisakusho K.K.).

Primary Examiner—Stanley D. Miller
Assistant Examiner—Richard F. Gallivan
Attorney, Agent, or Firm—Oblon, Fisher, Spivak, McClelland & Maier

[57] ABSTRACT

The device of the invention comprises mainly a liquid crystal screen illuminated by a light source. An electrically controlled modulating device is placed between the source and the screen. Depending on the desired illuminating intensity, the electrical signal will be adapted to the modulating device. The modulating device may comprise essentially a liquid crystal cell.

8 Claims, 3 Drawing Sheets

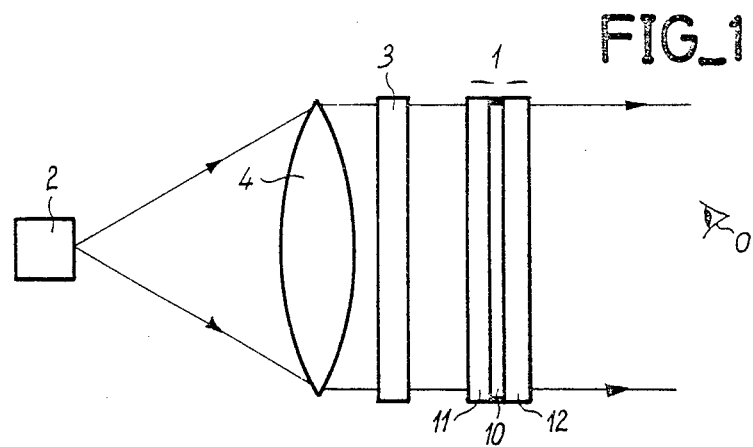
FIG_1
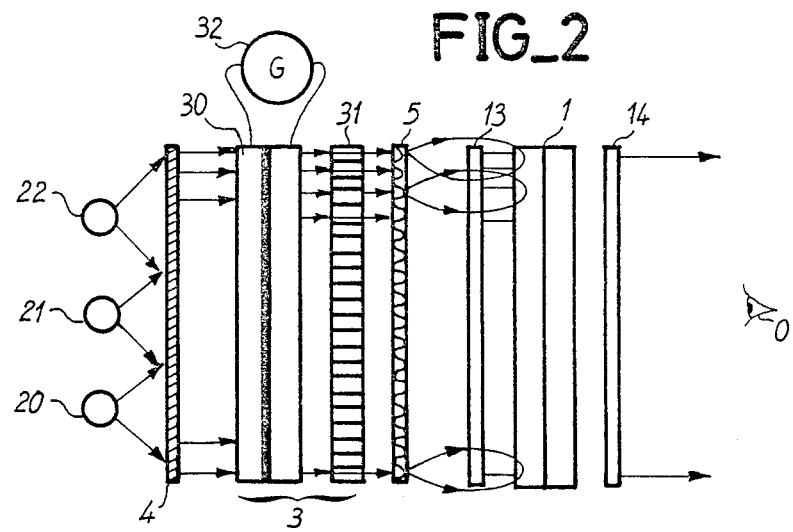
FIG_2
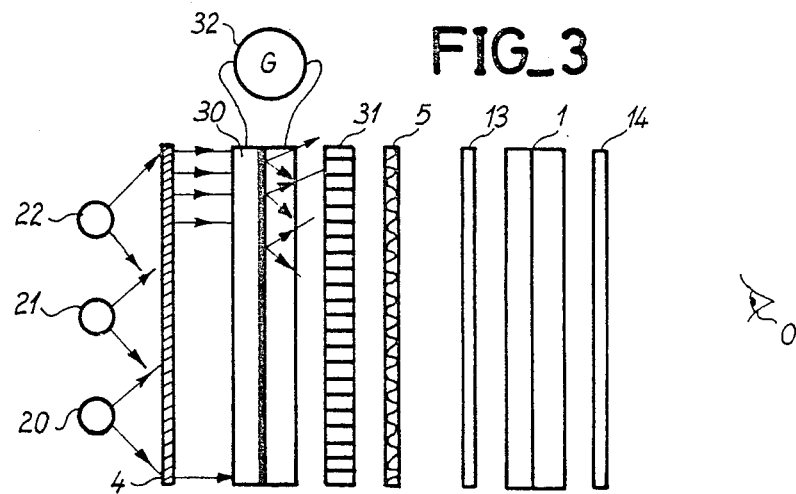
FIG_3

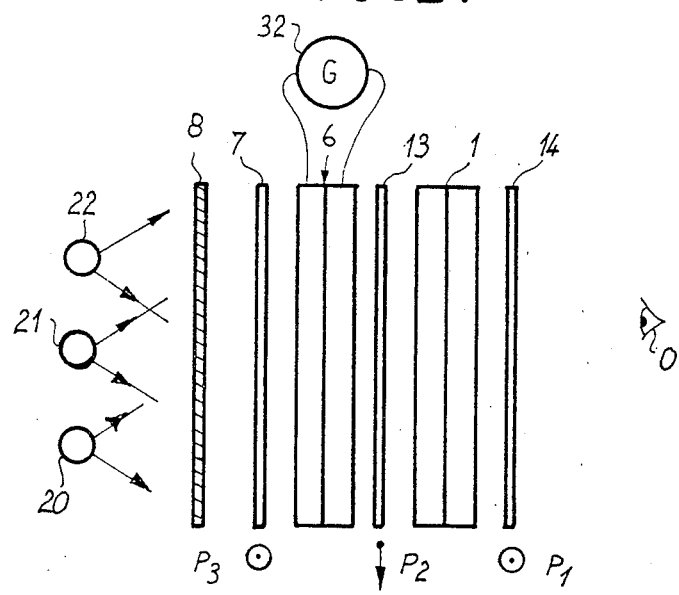
FIG_4
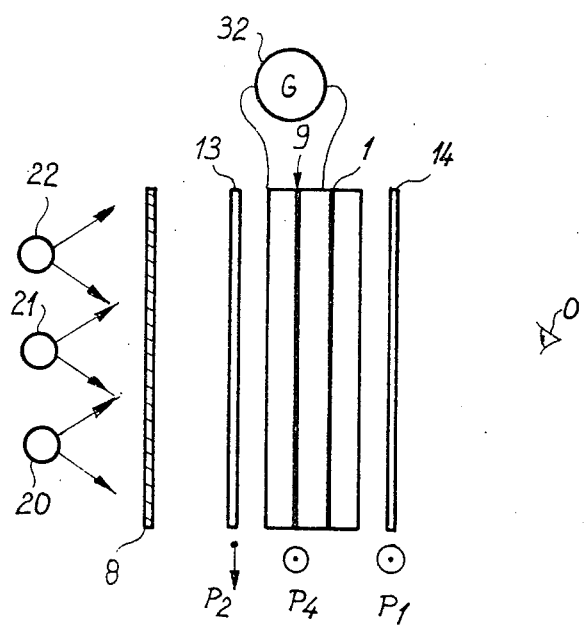
FIG_5

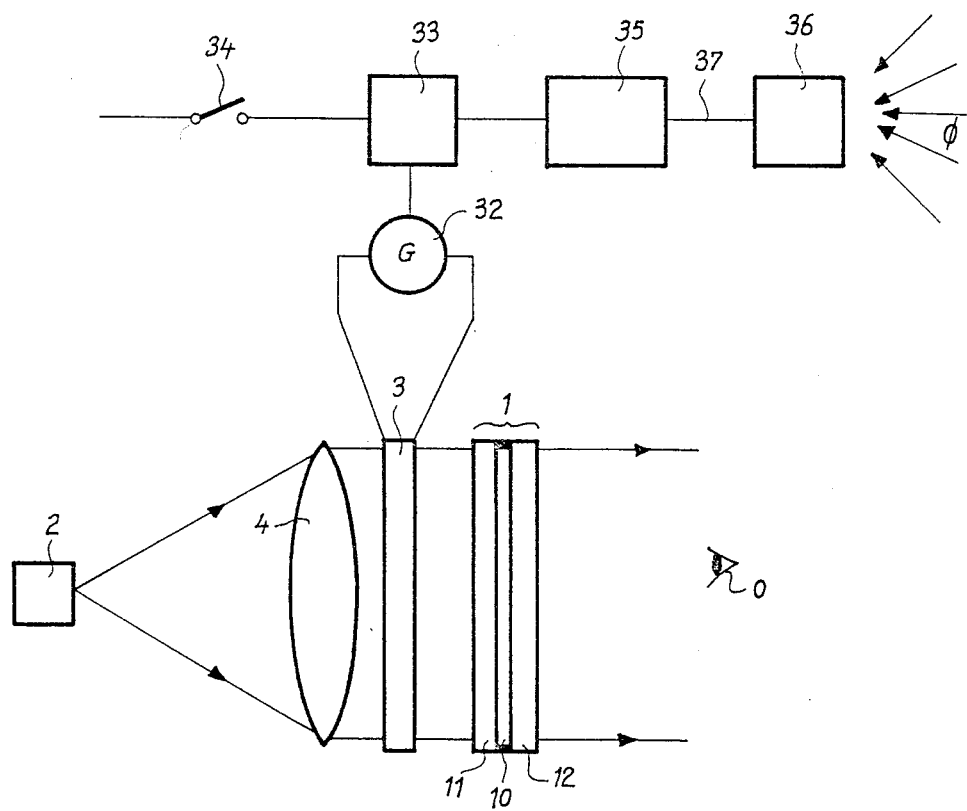
FIG_6

DEVICE FOR THE MODULATION OF THE ILLUMINATING LIGHT OF AN ELECTRO-OPTIC DISPLAY SCREEN

BACKGROUND OF THE INVENTION

The invention pertains to a device for the modulation of the illuminating light of an electro-optic display screen, and especially to a modulating device for a display screen working n transmission.

One of the problems encountered in flat light modulating screens, such as liquid crystal screens is the 10, difficulty of modifying the mean brilliance of these screens to observe them in highly variable light environments (from 100,000 lux to a few lux, for example).

The most obvious solution, in terms of its principle, is the one in which the light intensity of the lighting source, associated with this screen, is made to vary by a modification of the voltage or supply frequency of this source.

For flat screens, three types of lighting are generally used:
(a) Incandescent lighting,
(b) Electro-luminescent lighting,
(c) Fluorescent lighting.

Let us examine the possibility of modifying the luminous flux of these lightings:

(a) For incandescent lighting (whether halogenic or not) it is observed that:

The luminosity power can be made to vary continuously by modifying the supply voltage.

By contrast, this variation, which is accompanied by a modification in the color temperature, is unsuited to color screens.

(b) For lighting by electro-luminescence, this effect can easily be used to make a source of plane light, the luminous flux of which can be made to vary (by about one decade) by modifying the supply voltage. This type of source has two disadvantages:

The light intensity/voltage curve exhibits a threshold and is non-linear.

The light is emitted in a narrow spectral band.

(c) Finally, for a fluorescent lighting system:

The effect used, which is a discharge in a gas, has a voltage threshold below which it is impossible to light up the fluorescent tube. It is therefore very difficult to vary the luminous flux by varying the supply voltage. By contrast, a variation of the excitation frequency can be used to vary the fluxes emitted to a small degree.

The invention pertains to a modulation device which uses any type of light and avoids the disadvantages referred to above.

SUMMARY OF THE INVENTION

The invention therefore pertains to a device for the modulation of the illuminating light of an electro-optic display screen, comprising especially an illuminated electro-optic display unit, illuminated by transparency by a light source, the device also comprising means for the modulation of the light, these means being capable of being controlled electrically and located between the luminous zone and the electro-optical display unit.

BRIEF DESCRIPTION OF THE DRAWINGS

The various objects and characteristics of the invention will emerge more clearly in the following description, made with reference to the appended figures of which:

FIG. 1 is an example of a mode of embodiment of the modulating device of the invention;

FIG. 2 is a detailed example of a mode of embodiment of the modulating device of the invention in a state of operation, giving a high illumination;

FIG. 3 is a detailed example of a mode of embodiment of the modulating device of FIG. 2 in a state of operation, giving a low illumination;

FIG. 4 is an example of an alternative mode of embodiment of the modulating device of the invention;

FIG. 5 is another example of an alternative mode of embodiment of the modulating device of the invention;

FIG. 6 is an example of a mode of embodiment of the control circuits of the device according to the invention.

DETAILED DESCRIPTION OF THE INVENTION

FIG. 1 therefore depicts an example of a mode of embodiment of the device, according to the invention, for modulating the illuminating light of a liquid crystal screen.

This device comprises an electro-optical display unit, such as a liquid crystal screen 1, comprising two transparent blades, 11 and 12, which enclose a liquid crystal 10. According to this example of a mode of embodiment, the liquid crystal screen works in transmission. A light source 2 illuminates the liquid crystal screen 1 and enables an observer 0 placed to the right of the screen (in the figure) to see the information displayed on the screen by transparency.

A sighting device 4, represented by a lens, projects a parallel illuminating beam towards the screen.

According to the invention, a light modulator 3 has been placed between the liquid crystal screen and the light source 2 (and especially the sighting device 4).

This modulator is electrically controlled by non-depicted means, either manually or automatically depending on the ambient lighting which surrounds the liquid crystal screen 1. Preferably, although this is not obligatory, the light modulator 3 acts uniformly on the entire light beam projected on the liquid crystal screen.

Referring to FIG. 2, we shall describe a detailed example of a mode of embodiment of the device of the invention.

This example of a mode of embodiment again refers to the liquid crystal 1. It has been assumed that this screen works between polarizers (spiral nematic liquid crystal, electrically controlled birefringence, smectic C liquid crystal). Hence, two polarizers 13 and 14 have been provided on either side of the screen.

The light source 2 has been depicted by several sources 20, 21, 22 in order to give a more uniform illumination.

The sighting device 4 is made in the form of a Fresnel type lattice. It gives uniform illumination of the light modulator 3. The light modulator 3 comprises:

A liquid crystal cell 30 containing a negative dielectric anisotropic liquid crystal and controlled by a voltage source 30, 32;

A schlieren optic element such as a diaphragm 31 comprising, in its thickness, a filtering lattice by which the light rays, perpendicular to the surface of the diaphragm 31, can pass through, and which absorbs light rays that are perpendicular to the surface of the diaphragm. A diaphragm of this type can be found in the market in the form of plates containing, in its thickness, a lattice, the weaving of which provides for the filtering described above. This is thus a directional space filter of the "venetian blind" type such as the directional filters marketed under the brand name of MINNESOTA 3M ("Light Control Film").

When the generator 32 applies a low-frequency electrical field to the liquid crystal with negative, dielectric anisotropy, this crystal changes from a transparent state to a diffusion state.

To transform this effect into a luminosity variation, a schlieren optic element 31 or a diaphragm associated with the liquid crystal cell 13 is used:

the light is entirely transmitted in the non-excited state of the cell (and the diaphragm 31 is transparent).

there is extinction in the diffusion state, for the light is blocked by the diaphragm.

FIG. 2 depicts the working of the device when the maximum amount of light is transmitted to the liquid crystal screen 1.

FIG. 3 depicts the working of the same device when the minimum amount of light is transmitted to the liquid crystal screen 1 owing to the diffusion of the light thus diffused by the shutter 31.

A shutter of this type works with voltages of about 10 volts with response times of about 200 ms. The capacity of a shutter of this type depends on the diffusion obtained in the field and on the associated diaphragms. It is greater than $I/IO = 10$.

The light source thus obtained is collimated almost perfectly and, for screens that have to be observed with a wide angle, it is necessary to associated a second diffusion unit with it. This is why FIGS. 12 and 13 depict, between the diaphragm 31 and the liquid crystal screen 1 (or the polarizer 13), a diffusion unit 5 which diffuses the light coming from the diaphragm 31, as indicated by the energy lobes depicted in FIG. 2.

Referring to FIG. 4, we shall now describe an example of an alternative mode of embodiment of the invention.

This figure again depicts the liquid crystal screen 1, associated with its polarizers 13, 14, as well as the light sources 20, 21, 22.

Between the light sources 20, 21, 22, and the polarizer 13 are placed a diffusion unit 8, a polarizer 7 and a liquid crystal cell 6 containing a spiral nematic liquid crystal (TN).

In FIG. 4, above the polarizers 7, 13 and 14, there are symbols depicting the polarizing direction of these polarizers. It can thus be seen that the polarizing direction P3 of the polarizer 7 is orthogonal with the polarizing direction P2 of the polarizer 13 which is orthogonal with the polarizing direction P1 of the polarizer 14.

When the generator 32 applies a voltage to the liquid crystal cells 6, an electrical excitation field is applied. The liquid crystal cell 6 does not induce any rotation of polarization of the light. Under the action of the two orthogonal polarizers 7 and 13, the light transmitted by the sources 20 to 22 is not transmitted or is hardly transmitted to the liquid crystal screen 14. This screen is poorly lit.

When the generator 32 applies a voltage to the liquid crystal cell, the functioning is reversed and a maximum amount of light is transmitted to the liquid crystal screen 1.

As can be seen in the example of a mode of embodiment in FIG. 2, the polarizer 13 is common with the cell 6 and the screen 1, but it is also possible to envisage a case where the cell 6 has its own polarizer.

The polarizing directions P2 and P3 can also be parallel. The operations with maximum illumination and minimum illumination of the screen 1, depending on whether or not an electrical excitation field is applied, are then reversed as compared with the above description.

A modulating device of this type works with voltages of a few volts and response times of about 40 ms. The capacity of a shutter of this type is that of a displaying unit of this type, mainly $I/IO = 100$.

Finally, in the example of the mode of embodiment of FIG. 4, the sighting device 4 provided for in the devices depicted in FIGS. 1 to 3 is not necessary owing to the type of operation of the liquid crystal cell 6.

According to another alternative mode of embodiment of the invention depicted in FIG. 5, a dichroic coloring agent, which may or may not absorb a polarization depending on its direction, is associated with the liquid crystal of the cell that acts as the light modulator. In the case of a geometry which is planar at rest and homeotropic under a field, it is possible to move from an absorbent state to a non-absorbent state. The characteristics of the electro-optical effect are appreciably identical to those of the liquid crystal.

According to the example of the mode of embodiment of FIG. 5, a liquid crystal cell 9, thus described, has been attached to the liquid crystal cell 1.

On either side of this screen/cell unit, there are two orthogonal polarizers 13 and 14, the polarizing directions P1 and P2 of which as well as the polarizing direction P4 of cell 7 are indicated at the bottom of FIG. 5.

This alternative mode of embodiment gives a more compact structure than the preceding embodiments and calls for one polarizer less than the embodiment depicted in FIG. 4.

Finally, achromatic shutters of this type can be used, without leaving the scope of the invention, for other electro-optical effects:
(a) Diffusion/transparency effects;
  The combined thermal and dielectrical effect which has the advantage of memory.
  Cholesteric-nematic transition (memory).
  Effect of an electrical field on a piezoelectric ceramic of the PLZT type.
(b) Absorption of light: for example the cholesteric-nematic transition with a coloring agent.
  All these modulators exhibit common characteristics:
  Simplicity: liquid crystal cell type of structure, the making of which is identical to that of the displaying unit.

This cell, in the case of the nematic crystal with a coloring agent, can be made by using one of the surfaces of the screen itself as a substrate.

Supply voltages similar to that of the screen.
Totally achromatic systems.

Electrically controlled shutters of this type can be used to modulate the light intensity of illuminating systems associated with non-emissive screens (for example, liquid crystal screens). They generally have a low insertion loss and are perfectly suited to color screens because they are achromatic.

For a shutter with a capacity of about 100 (spiral nematic liquid crystals), the screens can be observed within an illumination range of 100,000 lux to 10 lux, the eye having an inherent capacity of about 100.

It is clear that other alternative embodiments of the invention are possible without leaving its scope. Besides the digital values are given only by way of indication to illustrate the invention.

As mentioned above, the modulating device can be controlled either manually or automatically, depending on external events such as ambient lighting.

Referring to FIG. 6, we shall describe circuits used to establish this control.

The device of FIG. 1 has been repeated to depict these circuits, but they are applicable to other forms of embodiment of the invention.

The modulator 3, made in the shape of liquid crystal cells (30, 6 and 9) in the examples of embodiment of FIGS. 2 to 5, is controlled by a voltage generator 32. The value of the voltage given by this generator 32 is controlled by a control circuit 33.

The control circuit is controlled:

Either manually by a circuit which has been depicted in a simplified manner by a contact 34 which can be controlled manually and applies control signals to the circuit 33;

Or automatically by means of circuits 35 and 36 which react, for example, to the ambient lighting in which the liquid crystal 1 and the observer 0 are placed.

In this latter type of control, the circuit 36 is, for example, a photodetector or any other detection circuit which is sensitive to the luminous flux $\phi$ it receives and which gives a signal reflecting the light intensity received to a link 37. This signal is transmitted to a processing circuit 35 which, depending on this signal, sends a control signal to the control circuit 33 which controls the generator 32 in an appropriate way.

For example, if the intensity of the light radiation (ambient light) received by the detection circuit 36 is low (corresponding to semi-darkness for example), the circuit 33 will control the generator 32 in such a way that the said generator 32 gives a voltage level to the modulating device which will attenuate the intensity of the illuminating beam given by the source 2 to the liquid crystal screen 1.

In reverse, if the intensity of the light radiation received by the detection circuit 36 is high, the modulating device will provide for more intense illumination of the liquid crystal screen 1.

The device of the invention can thus be used to adapt the displaying luminosity of a liquid crystal screen to the ambient lighting conditions in which a user of this screen is placed.

The circuits 32 to 36 of FIG. 6 can be easily made in the current state of the art in order to use the invention. It is therefore not necessary to describe them in detail. The detecting device will preferably be placed near the liquid crystal screen and, if possible, on the front of this screen.

What is claimed is:

1. An illuminated electro-optic display device comprising:
    a light source for illuminating said electro-optic display device
    electrically controlled means for modulating said light source which is located between said light source and said electro-optic display device;
    a voltage generator connected to said electrically controlled modulating means for supplying a control voltage thereto; and
    an ambient light detection circuit for detecting ambient light intensity and coupled to said voltage generator for controlling said voltage generator responsive to said detected ambient light.

2. A device according to claim 1, wherein said electro-optic display device comprises:
    a twisted nematic liquid crystal containing a dichroic coloring agent.

3. A device according to claim 2, wherein the liquid crystal cell is attached to the electro-optic display unit.

4. A device for the illumination of an electro-optic display device according to claim 3, wherein:
    the electro-optic display unit comprises a twisted nematic liquid crystal,
    the unit comprising the electro-optic display unit and the liquid crystal is placed between a first polarizer and a second polarizer with orthogonal polarizing directions.

5. A device according to claim 1, further comprising: between the detection circuit and the generator:
    a processing circuit that receives a detection signal from the detection circuit, processes the said detection signal and gives a control signal in exchange;
    a control circuit receiving the said control signal and controlling the voltage generator.

6. An illuminated electro-optic display device comprising:
    a light source for illuminating said electro-optic display device;
    a twisted nematic liquid crystal placed between said light source and said electro-optic display device and which has a negative dielectrical anisotropy such that it has two states, one transparent state and the other, a diffusion state, dependent upon an electrical field being applied thereto;
    means for modulating the amount of light passing through said twisted nematic liquid crystal from said light source to said electro-optic display device; and
    a diaphragm located between the said liquid crystal and the electro-optic display unit, this diaphragm letting through light which is perpendicular to its plane and blocking light which is oblique with respect to its plane.

7. Device for the modulation of the illuminating light of an electro-optic display device according to claim 6, wherein the diaphragm comprises a filtering lattice.

8. A device, as in claim 6, further comprising:
    two polarizing means placed on both sides of said twisted nematic liquid crystal cell and each having a polarizing direction which is orthogonal to the other.

* * * * *